United States Patent [19]

Balhorn

[11] Patent Number: 5,553,510
[45] Date of Patent: Sep. 10, 1996

[54] MULTI-SPEED TRANSMISSION

[76] Inventor: Alan C. Balhorn, 361 S. Fork, Plainwell, Mich. 49080

[21] Appl. No.: 395,093

[22] Filed: Feb. 27, 1995

[51] Int. Cl.$^6$ .............................. F16D 23/00; F16H 3/34
[52] U.S. Cl. .......................... 74/354; 74/128; 74/337.5; 74/594.2; 192/64
[58] Field of Search ................................ 74/594.2, 337.5, 74/354, 128; 192/64

[56] References Cited

U.S. PATENT DOCUMENTS

| | | |
|---|---|---|
| 628,839 | 7/1899 | Newsom . |
| 652,275 | 6/1900 | Krastin .................................... 74/354 |
| 2,538,625 | 1/1951 | Moore ..................................... 74/354 |
| 3,162,058 | 12/1964 | Matthew .................................. 74/354 |
| 3,209,609 | 10/1965 | Kirschmann ............................ 74/354 |
| 3,266,332 | 8/1966 | Misson ..................................... 74/354 |
| 3,540,309 | 11/1970 | Shimano et al. ....................... 74/594.2 |
| 3,637,055 | 1/1972 | Young . |
| 3,889,547 | 6/1975 | Sun et al. . |
| 3,920,263 | 11/1975 | Bundschuh . |
| 4,183,262 | 1/1980 | Segawa .................................. 74/594.2 |
| 4,301,690 | 11/1981 | Cavenagh ........................... 74/337.5 X |
| 4,324,323 | 4/1982 | Campagnolo ............................ 192/64 |
| 4,419,905 | 12/1983 | Lapeyre ............................. 74/337.5 X |
| 4,706,982 | 11/1987 | Hartmann . |
| 4,721,015 | 1/1988 | Hartmann . |
| 4,770,433 | 9/1988 | Hartmann . |
| 4,926,714 | 5/1990 | Bailey .................................... 74/337.5 |

FOREIGN PATENT DOCUMENTS 836753  10/1937  France ....................................... 192/64

*Primary Examiner*—Charles A. Marmor
*Assistant Examiner*—Troy E. Grabow
*Attorney, Agent, or Firm*—Kinney & Lange, P.A.

[57] ABSTRACT

A multi-speed transmission for transmitting power between a first shaft and a second shaft includes a plurality of gear sets, a plurality of connector gears corresponding to the plurality of gear sets and a shifting mechanism. Each gear set includes a first gear rotatably disposed about the first shaft, a uni-directional free wheeling mechanism between the first gear and the first shaft, and a second gear coupled to the second shaft. The uni-directional free wheeling mechanism permits the first gear to freely rotate about the shaft when the first gear rotates in a preselected direction relative to the rotation of the first shaft and locks the first gear to the first shaft at all other times. The first and second gears are spaced apart from one another but may be interconnected by one of the plurality of connector gears. Each connector gear is movable between an engaged position and a disengaged position. In the engaged position, each connector gear mutually engages the first gear and the second gear of the gear set. In the disengaged position, each connector gear is disengaged from the first gear and the second gear. The shifting mechanism moves each one of the plurality of connector gears between the engaged position and the disengaged position. The shifting mechanism maintains at least one of the plurality of connector gears in the engaged position at all times.

21 Claims, 6 Drawing Sheets

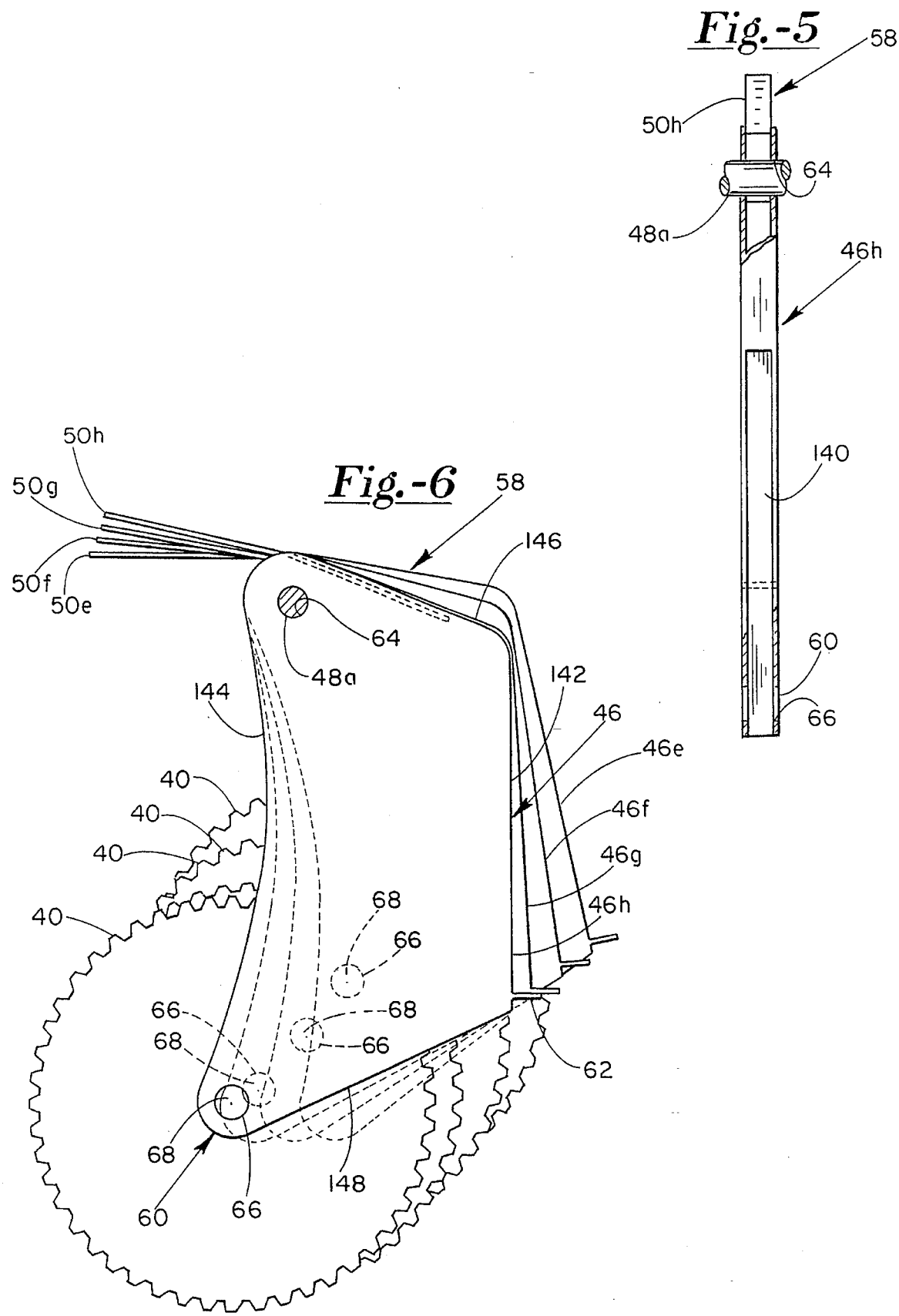

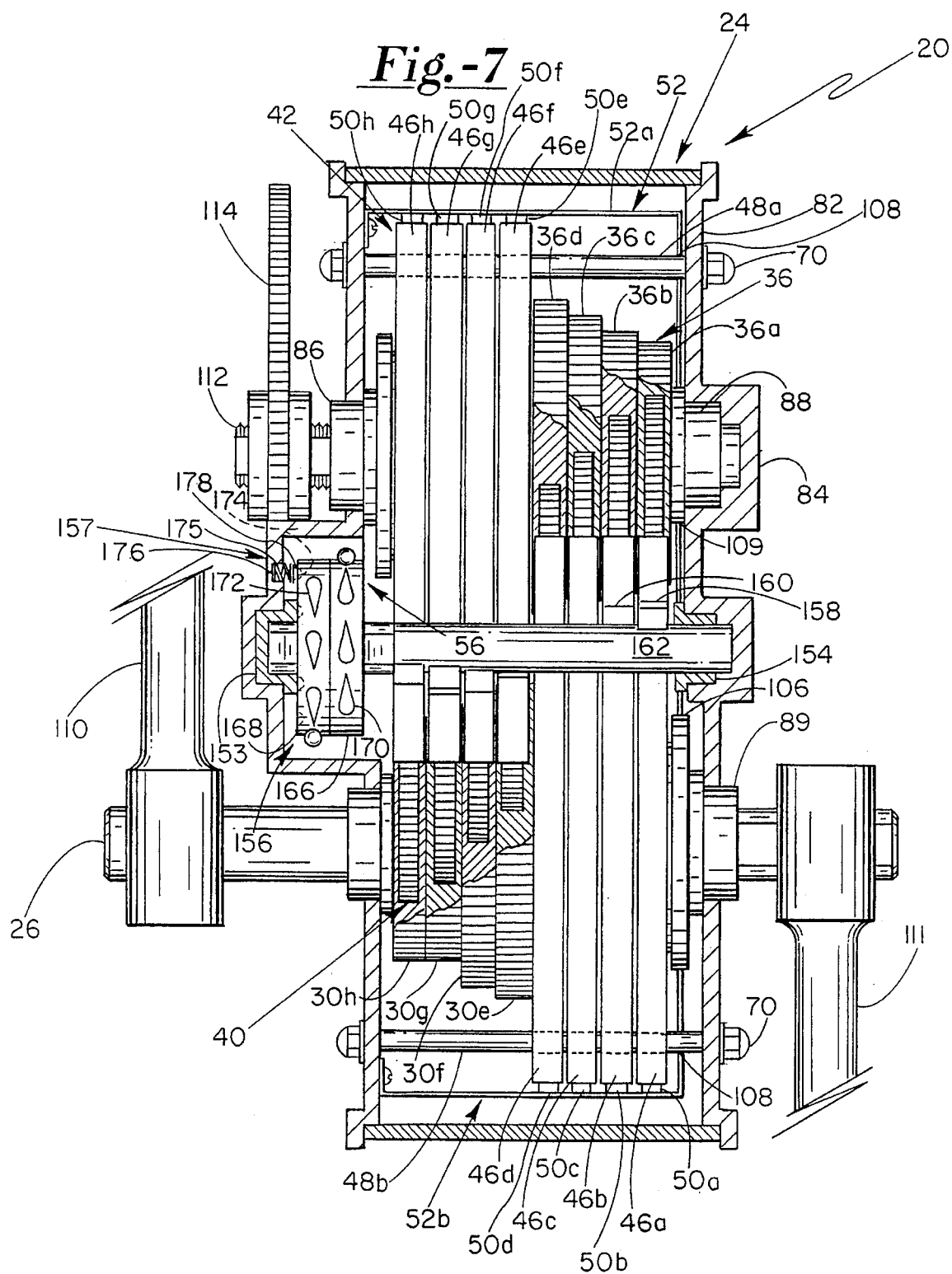

MULTI-SPEED TRANSMISSION

BACKGROUND OF THE INVENTION

The present invention relates to a multi-speed transmission for transmitting power between a pair of shafts. In particular, the present invention relates to a multi-speed transmission wherein a uni-directional free wheeling mechanism is provided between a gear and its shaft so that the gear rotates freely about its shaft when the gear rotates in a preselected direction relative to the rotation of its shaft and so that the gear is locked to its shaft at all other times. As a result, only one gear set transmits power from an input shaft to an output shaft when a plurality of gears of the input shaft are interconnected to a plurality of gears of the output shaft.

Transmissions are utilized in a wide variety of vehicles and stationary equipment to transmit power and to change rotational speeds between input and output shafts. Generally, power is supplied to the input shaft either mechanically or non-mechanically. In applications where power is mechanically applied to the input shaft, a clutch mechanism is usually required to interrupt the transmission of power and to shift gear speeds.

Bicycles are examples where the power supply is provided to the input shaft by non-mechanical means. As a result, the rotation of the input shaft may be easily interrupted without a clutch mechanism. Bicycles typically include chain derailleur mechanisms for shifting a drive chain from one sprocket to an adjacent sprocket to change speed ratios. Most multi-speed bicycles have derailleurs and multiple sprockets at both the front pedal hubs and rear wheel hubs to provide a variety of speed ratios. Furthermore, most chain sprocket systems may be shifted under full power.

However, chain and sprocket systems suffer from several key disadvantages. The multiple sprockets at both the front pedal hubs and the rear wheel hubs are interconnected by the drive chain which extends along a substantial length of the bicycle. As a result, chain and sprocket systems are difficult to house or enclose. Consequently, the chain and sprockets are susceptible to damaging impacts and are exposed to road elements such as dirt and water. Damaging impacts may cause the derailleur mechanisms or sprockets to become bent or misaligned which may impair shifting between sprockets. Moreover, road elements may also come in contact with the derailleur, chain or sprocket to hamper shifting or even damage the components. As a result, the performance of chain and sprocket systems becomes impaired unless the chain and sprocket systems are periodically cleaned and adjusted.

In addition, chain and sprocket systems have inherent design limitations which limit the effective number of speed ratios which may be provided. As a result, chain and sprocket systems do not provide as many speed ratios as indicated by their conventional designations. For example, a bicycle having three sprockets at the front pedal hub and seven sprockets at the rear wheel hub is conventionally designated as a "21 speed" bicycle. Although the bicycle has 21 sprocket combinations, the "21 speed" bicycle actually provides only 11 speed ratios as illustrated by Table 1. Table 1 shows twenty-one sprocket combinations and their associated speed ratios for a typical "21-speed" bicycle. Table 1 also shows the percent of change between speed ratios of adjacent sprocket combinations.

TABLE 1

Speed Ratios and Percent of Change of "21-Sprocket Combination" Chain and Sprocket System

| Pedal Hub Sprocket Teeth | | | | | | | | |
|---|---|---|---|---|---|---|---|---|
| 48 | | | 38 | | | 28 | | |
| Rear Hub Teeth | Ratio | Percent of Change | Rear Hub Teeth | Ratio | Percent of Change | Rear Hub Teeth | Ratio | Percent of Change |
| 30 | 3.69 | | | | | | | |
| | | 15.4 | | | | | | |
| 26 | 3.20 | | | | | | | |
| | | 13.3 | | | | | | |
| 23 | 2.82 | | 30 | 2.92 | | | | |
| | | 17.6 | | | 15.4 | | | |
| 20 | 2.40 | | 26 | 2.53 | | | | |
| | | 15.0 | | | 13.3 | | | |
| 17 | 2.09 | | 23 | 2.24 | | 30 | 2.15 | |
| | | 13.0 | | | 17.6 | | | 15.4 |
| 15 | 1.85 | | 20 | 1.90 | | 26 | 1.87 | |
| | | 15.4 | | | 15.0 | | | 13.3 |
| 13 | 1.60 | | 17 | 1.65 | | 23 | 1.65 | |
| | | | | | 13.0 | | | 17.6 |
| | | | 15 | 1.46 | | 20 | 1.40 | |
| | | | | | 15.4 | | | 15.0 |
| | | | 13 | 1.27 | | 17 | 1.22 | |
| | | | | | | | | 13.0 |
| | | | | | | 15 | 1.08 | |
| | | | | | | | | 15.4 |
| | | | | | | 13 | 0.93 | |

As shown in bold by Table 1, the speed raft as provided by the second hub sprocket having 38 teeth and the third hub sprocket having 28 teeth are redundant except for the two lower speed ratios of each sprocket. Similarly, an 18 speed system provides only 10 effective ratios, a 14-speed system provides only 9 effective ratios and a 12-speed system provides only 8 effective ratios.

As further illustrated by Table 1, chain and sprocket systems also fail to provide a smooth power curve. The number of teeth in the rear hub sprockets of chain and sprocket systems are typically selected so as to provide a degree of uniformity in speed ratios when used in conjunction with the pedal hub sprockets. However, because the number of teeth and the size of sprockets used on bicycles is limited the combinations of front and rear sprocket teeth are also limited. As a result, chain and sprocket systems result in an erratic percent of change between speed ratios which results in a poor power curve. A preferred power curve for most bicycle applications would have a lower percent of change between lower speed ratios and a higher "overdrive" percent of change between higher speed ratios.

Furthermore, chain and sprocket systems require extensive shifting of both the front and rear sprockets. For example, shifting of the front sprocket may require additional shifting of the rear sprocket by several ranges just to maintain the same speed ratio. In addition, chain and sprocket systems also require shifting twice or "cross-shifting" to reach all speed ratios. As illustrated in Table 1 for the 21-sprocket combination bicycle, shifting from the highest speed ratio of the pedal hub sprocket with 28 teeth to the next higher speed ratio would require first shifting to the pedal hub sprocket with 38 teeth and then shifting from the rear hub sprocket with 30 teeth to the rear hub sprocket with 26 teeth. This extensive shifting is difficult as well as confusing.

In an attempt to protect chain and sprocket systems from road elements such as dirt and water, several modifications have been made to multi-speed bicycle transmissions. For example, Hartman U.S. Pat. No. 4,770,433 (Hartman '433) discloses an enclosed multiple speed drive for mountain bicycles. Hartman '433 discloses four drive gears rotatably mounted on a drive carrier and three drive gears rotatably mounted on a driven carrier. Each gear is meshed with a corresponding gear on each of four countershafts. Hartman '433 utilizes a first gear selector to lock a selected drive gear to the drive gear carrier and a second gear selector to lock a selected driven gear to the driven gear carrier. The shifting arrangement of Hartman '433 requires that each gear selector be moved to a neutral position before engaging a successive gear. As a result, the transmission does not provide continuous power while shifting. In addition, because two shifting mechanisms are employed, "cross-shifting" is required to reach all possible speed ratios. Furthermore, the selection of speed ratios is also limited because the distance from the center line of the gear carrier to the center line of the countershaft is fixed and the sum of the radii of each gear set must exactly match this preset distance. The free-wheeling mechanism shown in FIG. 4 of Hartman '433 is external to the transmission and allows the rear wheel to continue to rotate if the rider ceases pedalling. Because all thirty-five gears of Hartman '433 are meshed and rotating continuously, the transmission of Hartman creates considerable friction and results in wasted effort on the part of the rider.

Similarly, Bailey U.S. Pat. No. 4,926,714 (Bailey '714) describes an enclosed multi-gear transmission that requires reverse pedalling to shift gears. However, as with Hartman '433, the transmission of Bailey '714 does not allow for shifting under continuous power. Bailey '714 discloses gears rotatably positioned about the pedal shaft. Each gear includes an internal pawl disposed in a pawl slot within a pedal shaft. Bailey '714 changes or shifts gear speeds by axially positioning a single pawl selector finger within a channel adjacent the slot within the pedal shaft to cause a selected pawl of a selected gear to engage the selected gear so as to couple the shaft to the selected gear. Movement of the pawl selector finger out from under the selected pawl causes the selected pawl to retract within the slot and to be completely disengaged from its corresponding gear. By selectively positioning the pawl selector finger, different pawls may be forced into engagement with their respective gears to provide different speed ratios. As the pawl selector finger 108 is axially moved between pawls, power from the pedal shaft is not transmitted to the output shaft via any gears. The shifting arrangement of Bailey '714 does not provide continuous power while shifting. Because the individual pawls of each gear are not biased so as to be in constant engagement with each pawl's respective gear, the pawls of Bailey '714 do not automatically lock the input shaft to the gear in response to the relative rotational directions of the pedal shaft and the gear.

Moreover, because the center line of the gear shafts are a fixed dimension apart, the transmission of Bailey '714 also provides only a restricted number of different gear radii and speed ratios. As in Hartman '433, the transmission of Bailey '714 requires that all of the gears mesh with one another and rotate continuously. Consequently, a considerable amount of friction and wasted effort results.

SUMMARY OF THE INVENTION

The present invention is an improved multi-speed transmission for transmitting power between an input shaft and an output shaft. The input shaft carries a plurality of differently sized gears and the output shaft carries a plurality of differently sized gears. The output shaft is rotated at a variety of speeds by interconnecting the differently sized gears of the input shaft and the output shaft. A uni-directional free wheeling mechanism is provided between at least one of the plurality of gears and the gear's shaft. The uni-directional free wheeling mechanism permits the gear to freely rotate about the gear shaft when the gear rotates in a preselected direction relative to the rotation of the gear's shaft. The uni-directional free wheeling mechanism automatically locks the gear to the gear's shaft at all other times. As a result, only one gear set transmits power from the input shaft to the output shaft when a plurality of gear sets between the input shaft and the output shaft are interconnected.

BRIEF DESCRIPTION OF THE DRAWINGS

FIG. 5 is an end view of a yoke of the multi-speed transmission.

FIG. 6 is a side view of yoke springs, yokes and connector gears pivoted about a pivot rod.

FIG. 7 is a sectional view of the multi-speed transmission taken along lines 7—7 of FIG. 1.

DETAILED DESCRIPTION OF THE PREFERRED EMBODIMENTS

The present invention is a multi-speed transmission for transmitting power between input and output shafts. A first one of the shafts carries a plurality of differently sized gears while a second one of the shafts carries a gear. The output shaft is rotated at a variety of speeds by interconnecting the gears of the input and output shaft. A plurality of uni-directional free wheeling mechanisms are between the first one of the shafts and the plurality of differently sized gears. Each one of the plurality of uni-directional free wheeling mechanisms is aligned with and corresponds to one of the plurality of differently sized gears. Each uni-directional free wheeling mechanism permits its corresponding gear to freely rotate about the first one of the shafts when the corresponding gear rotates in a preselected direction relative to the rotation of the first one of the shafts. Each uni-directional free wheeling mechanism further automatically locks its corresponding gear to the first one of the shafts at all other times. As a result, only one of the plurality of differently sized gears of the first one of the shafts is interconnected to the gear of the second one of the shafts.

The present invention may be used in a wide variety of vehicles and stationary equipment such as motor vehicles, bicycles, winches and block/tackle equipment. However, for purposes of illustration, the present invention is depicted in FIGS. 1–9 for use on a multi-speed bicycle.

Throughout the specification of the application, various terms are used such as "left", "right", "front", "rear" and the like. These terms denote directions with respect to the drawings and are, not limitations of orientation of the present invention. Rather, these terms are provided for clarity in describing the relationship between members of the transmission. For example, the terms "left" and "right" are used in describing relationships between components when viewed from the front end of the multi-speed bicycle.

I. OVERVIEW

Figure 1:
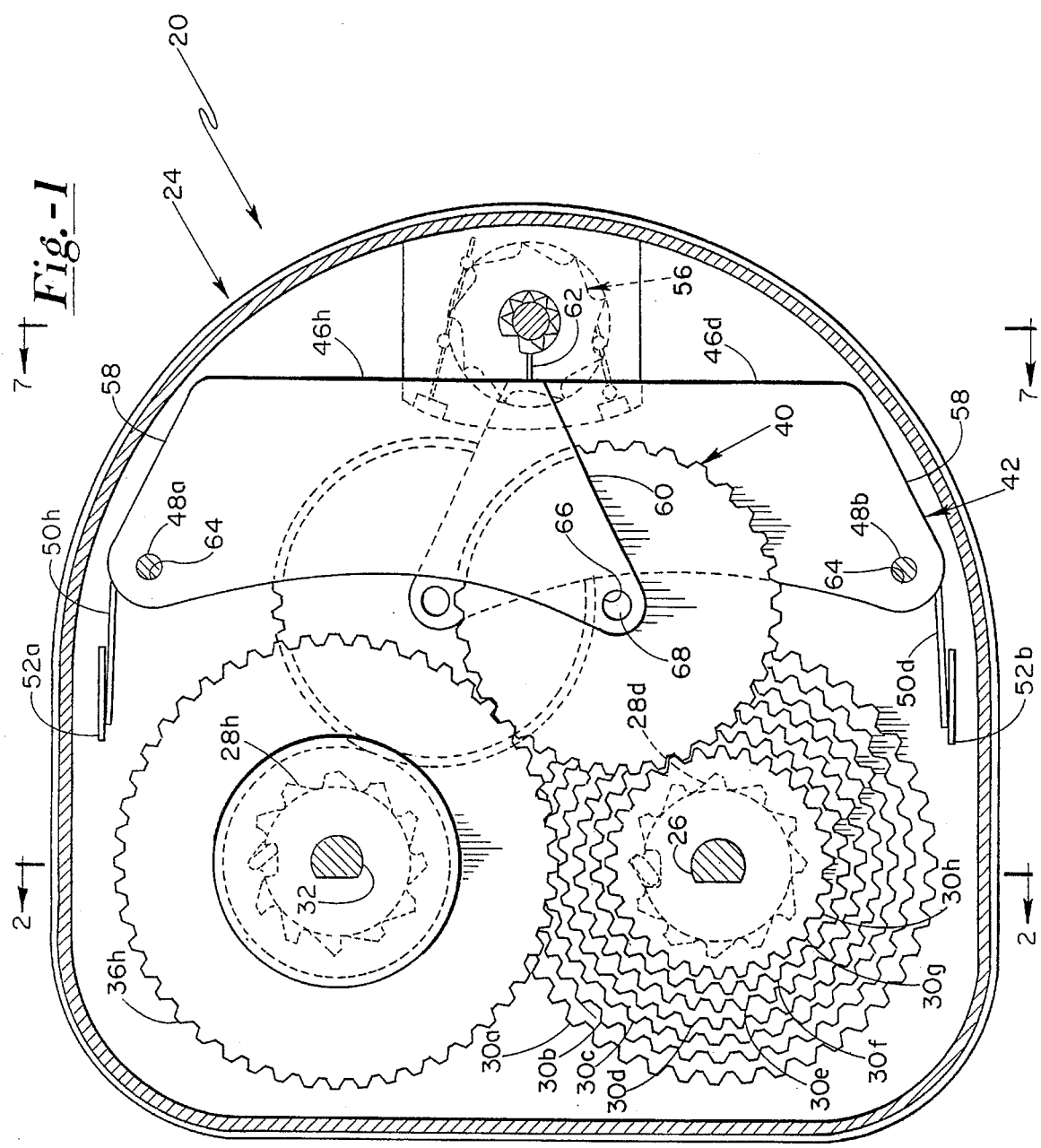
FIG. 1 is a side view of a multi-speed transmission with a right casing removed and shafts shown in section.

FIG. 1 illustrates multi-speed transmission 20 from the left side of transmission 20 with the left casing 82 (shown in FIG. 2) removed. Transmission 20 generally includes transmission housing 24, input shaft 26, uni-directional free wheeling mechanisms 28a–28d (best shown in FIG. 2), input gears 30a–30h, output shaft 32, uni-directional free wheeling mechanisms 28e–28h (best shown in FIG. 2), output gears 36a–36h (best shown in FIG. 2), connector gears 40 and shifting mechanism 42. When employed in a bicycle, housing 24 of transmission 20 is preferably mounted at the conventional location of the pedal shaft of the bicycle. Housing 24 substantially encloses and houses transmission 20 to protect it from damaging impacts and to protect the inner components of transmission 20 from road elements such as dirt and water. Housing 24 further provides an enclosure and supporting structure for supporting and maintaining the alignment and positioning of the inner components of transmission 20. Housing 24 includes openings through which input shaft 26 and output shaft 32 project for coupling with the pedal cranks and the rear wheel sprocket, respectively.

Input shaft 26 is preferably made from the high strength material, such as steel, capable of withstanding large amounts of torque. Input shaft 26 projects through both sides of housing 24 and is coupled to a source of rotational power. When used in conjunction with a bicycle, input shaft 26 of transmission 20 is coupled to left and right pedal cranks (shown in FIG. 2). Power supplied to input shaft 26 is transmitted to output shaft 32 across one of the input gears 30, one of the connector gears 40 and one of the output gears 36 depending upon the desired speed ratio. Input shaft 26 carries uni-directional free wheeling mechanisms 28a–28d and an array of input gears 30a–30h.

Each uni-directional free wheeling mechanism 28a–28h preferably comprises a ratchet-loaded pawl mechanism as is conventionally used in the rear wheel hub of bicycles to allow the rider to cease pedalling and coast. Uni-directional free wheeling mechanisms 28a–28d are preferably fixedly coupled to input shaft 26 and are positioned between input shaft 26 and input gears 30a–30d, respectively. Each uni-directional free wheeling mechanism 28a–28d permits its respective input gear 30a–30d to freely rotate about input shaft 26 when its respective input gear 30 rotates in a preselected direction relative to the rotation of the input shaft 26. In the illustrated preferred embodiment, uni-directional free wheeling mechanisms 28a–28d are each oriented so as to permit each of their respective input gears 30a–30d to freely rotate about input shaft 26 when the respective input gear 30 rotates in a clockwise direction relative to the rotation of input shaft 26. At the same time, each uni-directional free wheeling mechanism 28a–28d is held in constant mutual engagement with input shaft 26 and its respective input gear 30a–30d so as to automatically lock its respective input gear 30a–30d to input shaft 26 at all other times. For example, if a particular input gear is rotating clockwise at a speed greater than the clockwise rotational speed of input shaft 26, the particular input gear is rotating clockwise relative to the rotation of input shaft 26. Thus, the particular input gear wild freely rotate about input shaft 26. Alternatively, if a particular input gear 30 is rotating clockwise at a speed less than the clockwise rotational speed of input shaft 26, the particular input gear 30 is rotating; counterclockwise relative to the rotation of input shaft 26. Thus, the particular input gear will be automatically coupled or locked to input shaft 26. Depending upon the relative rotational direction of gears 30a–30d and shaft 26, each uni-directional free wheeling mechanism 28a–28d will individually lock its corresponding gear 30a–30d to input shaft 26 or permit its corresponding gear to freely rotate about input shaft 26. Each gear 30 is either locked to input shaft 26 such that power is transmitted from input shaft 26 to the particular gear 30 or gear 30 is allowed to freely rotate about input shaft 26 such that power would not be transmitted from input shaft 26 to the particular input gear 30. As a result, when a plurality of gears 30a–30d are coupled by their respective connector gears 40 to their respective output gears 36, uni-directional free wheeling mechanisms 28 couple only the slowest rotating gear 30a–30d to input shaft 26. Uni-directional free wheeling mechanisms 28a–28d permit a plurality of input gears 30a–30d to be interconnected to a plurality of output gears 36 at the same time while only one input gear 30 is actually locked or coupled to input shaft 26. Because a plurality of input gears 30 may be interconnected to a plurality of output gears 36 without locking up the transmission, shifting between gear sets 38 to change gear speeds may be done under continuous power.

Input gears 30a–30h are an array of differently sized toothed wheels or gears encircling input shaft 26. Each gear 30 preferably includes teeth along its outer perimeter for engaging with one of connector gears 40. Gears 30 have selectively sized radii for providing different speed ratios when gears 30 are connected to output gears 36. Input gears 30 are spaced apart from output gears 36, but are sized and positioned with respect to output gears 36 so that input gears 30 may be connected to output gears 36 by connector gears 40. In the preferred embodiment, input gears 30 have teeth for engaging with the corresponding teeth of connector gears 40. As can be appreciated, other mechanisms may be used to engage input gears 30 with the connector gears 40. Each input gear 30 is in alignment with a corresponding output gear 36 to form gear sets 38a–38h (shown in FIG. 2).

Output shaft 32 is preferably made from a high strength material, such as steel, capable of withstanding large amounts of torque. Output shaft 32 projects out of housing 24 and is coupled to a sprocket coupled to the rear wheel of a bicycle or other means for transferring the rotational motion of output shaft 32 to a desired location. Output shaft 32 carries uni-directional free wheeling mechanisms 28e–28h and array of output gears 36e–36h (shown in FIG. 2).

Uni-directional free wheeling mechanisms 28e–28h are integral with or are fixedly coupled to output shaft 32 between output shaft 32 at least one of output gears 36e–36h. Uni-directional free wheeling mechanisms 28e–28h are substantially identical to uni-directional free wheeling mechanisms 28a–28d except that each uni-directional free wheeling mechanism 28e–28h is oriented so as to permits its respective output gear 36e–36h to freely rotate about output shaft 32 when its respective output gear 36 rotates in a counterclockwise direction relative to the rotation of the output shaft 32. At the same time, each unidirectional free wheeling mechanism 28e–28h is held in constant mutual engagement with input shaft 32 and its respective output gear 36e–36h so as to automatically lock its respective output gear 36e–36h to output shaft 32 at all other times. As a result, when a plurality of gears 36 are being driven their respective connector gears 40, uni-directional free wheeling mechanisms 28 couple only the fastest of gears 36 to output shaft 32. Uni-directional free wheeling mechanisms 28e–28h permit a plurality of input gears 30e–30h to be interconnected to the plurality of output gears 36e–36h at the same time while only one output gear 36 is actually locked to output shaft 32. Because the plurality of input gears 30e–30h may be interconnected to a plurality of output gears 36e–36h without locking up the transmission, shifting between gear sets 38e–38h to change gear speeds may be done under continuous power.

Output gears 36 are an array of differently sized toothed wheels or gears encircling output shaft 32. Output gears 36a–36h (best shown in FIG. 2) are carried by and rotatably encircle output shaft 32. Gears 36a–36h have selectively sized radii for providing a plurality of different speed ratios when gears 36 are connected to input gears 30. Output gears 36 are spaced apart from input gears 30, but are sized and positioned with respect to input gears 30 so that output gears 36 may be connected to input gears 30 by connector gears 40. In the preferred embodiment, output gears 36 have teeth for engaging with corresponding teeth of connector gears 40. As can be appreciated, other mechanisms may be used to engage output gears 34 with connector gears 40. Each output gear 36 is in alignment with a corresponding input gear 30 to form gear sets 38a–38h (shown in FIG. 2).

Connector gears 40 preferably comprise a plurality of toothed wheels of the same diameter. Connector gears 40 can be made from a variety of different materials including steel or high strength plastic. Connector gears 40 are rotatably mounted and supported by shifting mechanism 42 so as to be movable into mutual rotatable engagement with input gears 30 and output gears 36. Each connector gear 40 corresponds to a gear set formed by corresponding input gears 30 and output gears 36. When in mutual engagement with input gears 30 and output gears 36, connector gears 40 transfer power from input gears 30 to output gears 36. Each connector gear 40 is rotatably mounted to shifting mechanism 42 so as to be individually movable into mutual engagement with input gears 30 and output gears 36. As a result, a single gear set 38 or a plurality of gear sets 38 may be engaged at once by a single connector gear 40 or a plurality of connector gears 40, respectively. Because a plurality of connector gears 40 may be engaged with the plurality of gear sets 38 at the same time, power transfer between input shaft 26 and output shaft 32 is continuous even during shifting between different gear sets 38 to provide different speed ratios. Connector gears 40 are all preferably of the same size, and speed ratios are solely controlled by the size of input gears 30 and output gears 36 of each gear set 38.

In addition, because connector gears 40 are used to interconnect input gears 30 and output gears 36 and because input gears 30 and output gears 36 are spaced apart from one another, the radii of the input gears 30 and output gears 36 may be independently sized to provide tailored speed ratios and progressive power curves for different applications. For example, when transmission 20 is used in conjunction with a bicycle, different speed ratios and power curves may be provided for different bicycle uses such as racing, touring, mountain or trail riding, and street riding. Because the input gears 30 and output gears 36 do not engage one another, their diameters are not restricted to preset shaft-to-shaft dimensions. The potential number of gear sets and speed ratios is merely limited by the overall width of the transmission 20 and the required width of gears 30, 36 and 40.

Furthermore, because input gears 30 and output gears 36 are spaced apart from one another and are only interconnected when the particular gear set 38 is engaged by a connector gear 40, transmission 20 produces little friction and reduces wasted effort on the part of the rider. Because unidirectional free wheeling mechanisms 28a–28d lock, at most, two of their corresponding gears to input shaft 26 during shifting, the remainder of their corresponding gears encircling uni-directional free wheeling mechanisms 28a–28d freely rotate about input shaft 26. Similarly, because uni-directional free wheeling mechanisms 28e–28h lock, at most, only two of their corresponding gears to output shaft 32 during shifting, the remainder of the corresponding gears encircling uni-directional free wheeling mechanisms 28e–28h freely rotate about output shaft 32. As a result, input shaft 26 engages and drives, at most, two gear sets 38 during shifting. At all other times, input shaft 26 merely engages and drives a single gear set 38. Generally, output shaft 32 engages and drives, at most, two gear sets. Consequently, transmission 20 does not require large amounts of energy necessary for continuously rotating all the gear sets. Thus, transmission 20 provides multiple speed ratios in an enclosed protected housing while reducing the amount of energy required to rotate input shaft 26.

Shifting mechanism 42 selectively positions connector gears 40 in mutual rotary engagement with input gears 30 and output gears 36 and includes yokes 46a–46d and yokes 46e–46h (best shown in FIGS. 5–7), yoke pivot rods 48a, 48b, yoke springs 50a–50h, retainer 52 having retainer ends 52a, 52b and selector cam 56. Yokes 46a–46h are generally elongated thin members which are provided for pivotally and rotatably supporting each connector gear 40. Yokes 46a–46h each include a pivot end 58, a connector end 60 and a cam lobe contact 62. Pivot end 58 of each set of yokes 46a–46h defines an aperture 64 for receiving one of yoke pivot rods 48a, 48b. As a result, yokes 46a–46h pivot about aperture 64 and yoke pivot rods 48a, 48b such that connector gears 40 pivot into and out of engagement with input gears 30 and output gears 36.

Connector end 60 of each yoke 46a–46h defines an aperture 66 for receiving gear pins 68 which rotatably mount connector gears 40 to yokes 46a and yokes 46b. Gear pins 68 preferably comprise flush bearing pins. As a result, connector gears 40 are rotatable so as to transmit rotational motion from input gears 30 to output gears 34 when in mutual engagement with input gears 30 and output gears 34. Apertures 66 extend through connector end 60 of yokes 46a–46h and are preferably located at various positions so as to cause connector gears 40 to be moved into mutual engagement with the various combinations of differently sized input gears 30 and output gears 36 of gear sets 38.

The body of each yoke of yokes 46a–46h is preferably shaped so as to accommodate necessary locations of apertures 66 as well as gear pin 68 and connector gear 40. In the depicted preferred embodiment, each yoke is identically shaped for ease of manufacture and assembly. However, as can be appreciated, each yoke may alternatively have a unique shape for accommodating the necessary location of aperture 66 and gear pin 68 needed to position its respective connector gear 40 in mutual engagement with the particular gear set 38.

Cam lobe contacts 62 project forwardly (towards the front of the bicycle) from the body of each of yokes 46a–46h. In the preferred embodiment, cam lobe contact 62 is an elongate finger. Cam lobe contacts 62 of yokes 46a–46h are preferably aligned with one another and positioned along the longitudinal length of selector cam 56. Cam lobe contacts 62 are engaged by selector cam 56 so as to pivot yokes 46a–46h about yoke pivot rods 48a, 48b such that connector gears 40 are also pivoted into mutual engagement with the various gear sets formed by input gears 30 and output gears 34.

Yoke pivot rods 48a, 48b extend through apertures 64 of yokes 46a–46h to pivotally mount yokes 46a–46h to housing 24. In addition, as shown by FIG. 7, yoke pivot rods 48a and 48b extend through housing 24 and receive fasteners 70 which are screwed onto the ends of yoke pivot rods 48a, 48b to secure left and right casings of assembled housing 24 in place.

Yoke springs 50a–50h are preferably flat leaf-springs which have a first end coupled to pivot end 58 of yokes 46a–46h and have a second end engaging retainer ends 52a, 52b. Yoke springs 50a–50h spring load or bias connector end 60 of yokes 46a–46h and its corresponding connector gear 40 out of engagement with gear sets 38.

Retainer ends 52a, 52b are preferably positioned near the top and bottom of transmission 20 above and below springs 50a and springs 50b, respectively. Retainer ends 52a and 52b project above and below springs 50a and 50b, respectively, within housing 24. As a result, retainer ends 52a, 52b engage springs 50a–50h, so as to compress at least one of springs 50a–50h to pivot connector gears 40 out of engagement with the gear sets 38. In addition, retainer ends 52a, 52b hold springs 50a, 50b in position during assembly of transmission 20 so that each spring 50a, 50b does not need to be compressed when inserting shifting mechanism 42 into housing 24.

Selector cam 56 is positioned and enclosed within housing 24 in alignment with cam lobe contacts 62 of yokes 46a–46h. Selector cam 56 is generally an elongate cam which, upon being selectively rotated, engages cam lobe contacts 62 of yokes 46a–46h so that at least one of yokes 46a–46h and its corresponding connector gear 40 is maintained in mutual engagement with a corresponding gear set 38 comprising one of input gears 30 and one of output gears 36. Because at least one of yokes 46a–46h and its corresponding connector gear 40 is always maintained in engagement with the gear set formed from input gears 30 and output gears 34, power is continuously transmitted from input shaft 26 to output shaft 32. During shifting between gear sets to change speed ratios, selector cam 56 is configured such that a second connector gear 40 is pivoted into engagement with the successive gear set 38 formed from one of input gears 30 and one of output gears 36 before the preceding connector gear 40 is biased by one of springs 50a–50h out of engagement with the preceding gear set 38. As discussed above, uni-directional free wheeling mechanisms 28a–28h permit a plurality of gear sets 38 to be interconnected at once without transmission 20 locking up because uni-directional free wheeling mechanisms 28a–28h permit only one gear set to be locked between input shaft 26 and output shaft 32 to transfer power. As a result, transmission 20 provides tailored speed ratios and progressive power curves as well as an enclosed, linearly sequenced transmission that will shift under continuous power, have a minimum number of gears engaged at any one time, and will not require continuous adjustment.

Figure 2:
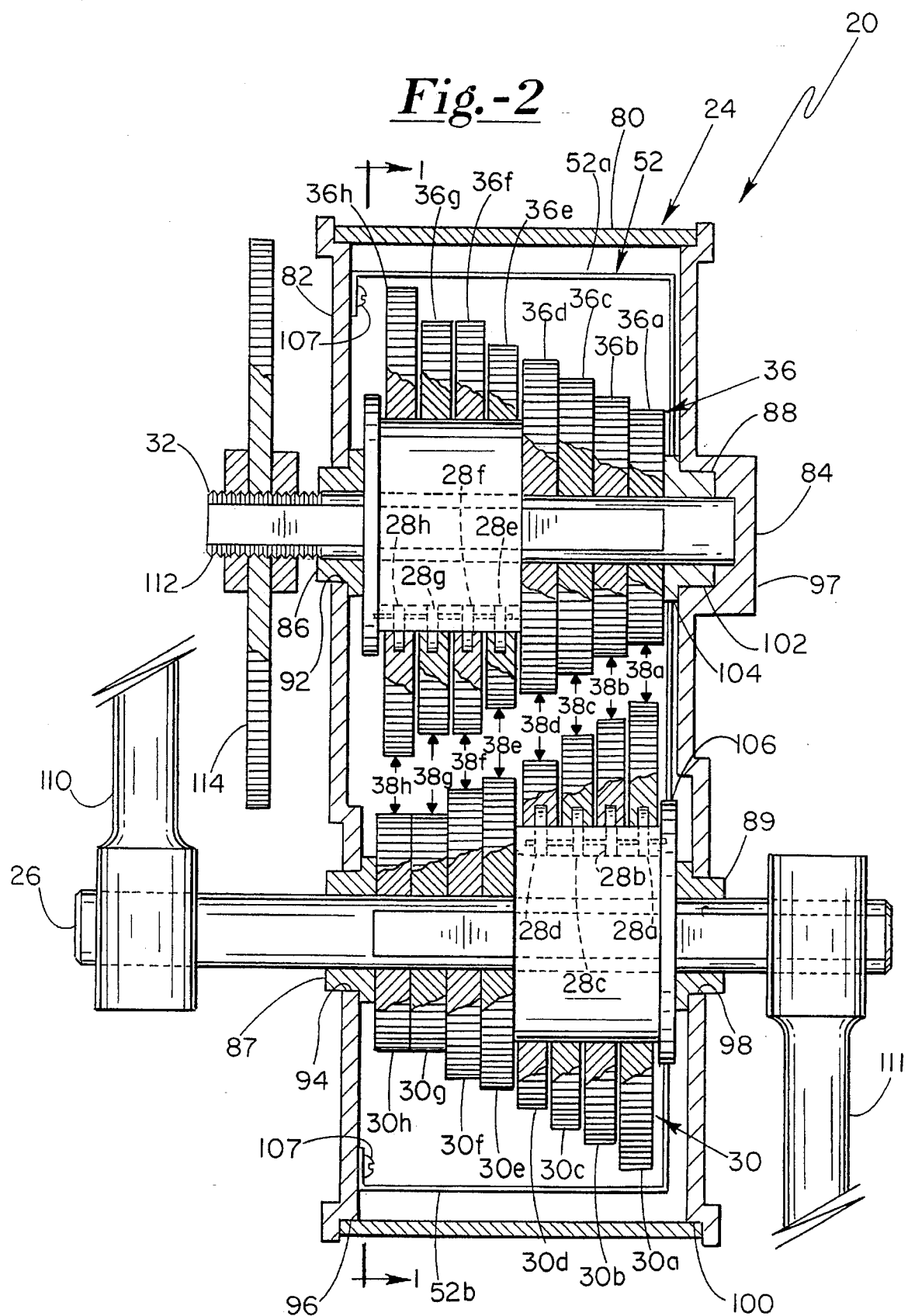
FIG. 2 is a sectional view of the multi-speed transmission taken along lines 2—2 of FIG. 1.

FIG. 2 shows a sectional view of transmission 20 taken along lines 2—2 of FIG. 1. FIG. 2 illustrates housing 24, retainer 52, input shaft 26, unidirectional free wheeling mechanisms 28a–28d, input gears 30a–30h, output shaft 32, uni-directional free wheeling mechanisms 28e–28h and output gears 36a–36h in greater detail.

II. HOUSING

As shown by FIG. 2, gearbox or housing 24 is a generally narrow oval shaped gearbox which includes ring 80, left casing 82, right casing 84, and sleeve bearings 86, 87, 88 and 89. Ring 80 encircles transmission 20. When transmission 20 is employed in a bicycle, ring 20 is preferably fabricated as an integral part of the bicycle frame. Ring 20 may be made from a variety of materials, but is preferably made from the same material as that of the bicycle frame. Alternatively, ring 20 may be mounted to the bicycle frame in any conventional well-known mariner.

Left casing 82 is a generally flat oval shaped plate fitted within and sealed to ring 80. Left casing 82 includes openings 92, 94 and ridge 96. Openings 92 and 94 extend through left casing 82 and are located and sized for the reception of sleeve bearings 86, 87, input shaft 26 and output shaft 32. Preferably, openings 92 and 94 are sized to form a tight fit with sleeve bearings 86 and 87, respectively, to form a tight seal so as to prevent road elements and contaminants from entering the interior of housing 24. Ridge 96 encircles the perimeter of left casing 82. Ridge 96 insets within ring 80 to seal between left casing 82 and ring 80 and to properly align inner components contained within housing 24. Left casing 82 is preferably mounted to ring 80 and may be formed from a different material such as injected plastic. Alternatively, left casing 82 may be formed integrally with ring 80.

Right casing 84 is a generally oval shaped plate having a perimeter identical to left casing 82. Right casing 84 includes flange 97, opening 98 and ridge 100. Flange 97 is integrally molded as part of right casing 84 and defines a cavity 102 sized for reception of sleeve bearing 85. Flange 97 supports sleeve bearing 86 and an end of output shaft 32 within housing 24 while preventing contaminants from entering into housing 24.

Similar to opening 94, opening 98 extends through right casing 84 and is sized and located for the reception of sleeve bearing 89 and input shaft 26. Preferably, opening 98 is sized so as to form a tight fit or seal with sleeve bearing 89 to prevent contaminants from entering the interior of housing 24.

Ridge 100 is similar to ridge 96 and extends along an outer perimeter of right casing 84. Ridge 100 insets within ring 80 so as to form a tight seal with ring 80 and to properly align the components of transmission 20 partially supported by right casing 84.

Sleeve bearings 86, 87, 88 and 89 are conventionally known and are mounted within apertures 92, 94, cavity 102 of flange 96 and aperture 98, respectively. Sleeve bearings 86 and 88 are aligned opposite one another and are supported by left casing 82 and right casing 84, respectively. Sleeve bearings 86 and 88 support and guide the rotation of output shaft 32. Sleeve bearing 86 also seals around output shaft 32 to prevent elements from entering the interior of housing 24. Sleeve bearings 87 and 89 are aligned opposite one another and are supported by left casing 82 and right casing 84, respectively. Sleeve bearings 87 and 89 support and guide the rotation of input shaft 26. In addition, sleeve bearings 87 and 89 also seal around input shaft 26 to prevent elements from entering the interior of housing 24. As can be appreciated, any bearing mechanisms such as ball bearings may be used in lieu of sleeve bearings 86, 87, 88 and 89 for rotatably supporting input shaft 26 and output shaft 32.

As best shown by FIGS. 2 and 7, retainer 52 is a generally shell-shaped member used for holding and aligning components of transmission 20 in place during assembly. Retainer 52 includes retainer ends 52a, 52b and openings 104, 106, 108 and 109. As discussed earlier, retainer ends 52a, 52b hold springs 50a, 50b in position during assembly of transmission 20 so that each spring 50a, 50b does not need to be compressed when inserting shifting mechanism 42 into housing 24.

As shown in FIG. 2, openings 104 and 106 extend through the right side of retainer 52. Opening 104 is sized and positioned for receiving output shaft 32 and sleeve bearing 88. Opening 106 is sized and positioned for receiving input shaft 26 and a portion of uni-directional free wheeling mechanisms 28a–28d. Openings 104 and 106 are sized so as to aid in the alignment of shafts 26 and 32, respectively, and the other components within housing 24 during assembly.

As shown in FIG. 7, openings 108 and 109 extend through the right side of retainer 52. Openings 108 are positioned near retainer ends 52a and 52b and are sized for receiving and aligning yoke pivot rods 48a and 48b. Opening 109 is located and sized for receiving an end of selector cam 56. Opening 109 aligns selector cam 56 within housing 24 during assembly. As a result, retainer 52 enables the components of transmission 20 to be more easily assembled and aligned with one another. Retainer 52 is preferably attached to left casing 82 by screws 107. Screws 107 extend through retainer 52 and threadably engage left casing 82 to secure retainer 52 in the desired position.

As discussed above, the present invention may have a variety of shapes, configurations and uses. However, for illustration purposes, the present invention is depicted as part of a bicycle transmission. Accordingly, as shown by FIG. 2, input shaft 26 is coupled to left pedal crank 110 and right pedal crank 111. Left and right pedal cranks 110, 111 are rotated by the bicycle rider to provide power to input shaft 26. As can be appreciated, power may be supplied to input shaft 26 by various other mechanical and non-mechanical means. Output shaft 32 includes a threaded end 112 threadably mounted to an output or pedal hub sprocket 114. In the depicted embodiment of the present invention, pedal hub sprocket 114 drives a chain (not shown) which engages a rear wheel sprocket (not shown) to transmit rotational motion from output shaft 32 to the rear wheel of the bicycle. As is conventionally known, the rear wheel hub of the bicycle may also have a conventional uni-directional free wheeling mechanism to allow the rider to cease pedalling and coast.

III. INPUT AND OUTPUT GEARS

As best shown by FIG. 2, input gears 30a–30h and output gears 36a–36h are carried by and rotatably encircle input shaft 26 and output shaft 32, respectively. Input gears 30e–30h and output gears 36a–36d are preferably fixedly secured to input shaft 26 and output shaft 32, respectively and abut one another to provide a more compact transmission 20. In contrast, input gears 30a–30d and output gears 36e–36h are releasably coupled to input shaft 26 and output shaft 32 by uni-directional free wheeling mechanisms 28a–28d and 28e–28f, respectively. Although compactly positioned adjacent one another, input gears 30a–30b and output gears 36e–36h are sufficiently spaced from one another so that each gear may freely and independently rotate with respect to adjacent gears.

As further shown by FIG. 2, input gears 30 have radii which generally decrease towards left casing 82. Output gears 36 correspond to each input gear 30 and have radii which increase towards left casing 82. Because input gears 30 and output gears 36 are opposingly arranged in size, transmission 20 is compact and takes up little space. Alternatively, input gears 30 and output gears 36 may be arranged in any desired configuration to provide a tailored power curve. Each input gear 30 is aligned with the corresponding output gear 36 to provide a plurality of gear sets 38a–38h. Each gear set 38a–38h provides a different speed ratio between input gear 30 and output gear 36. In the depicted embodiment, gear set 38a provides the highest gear speed while gear set 38h provides the lowest gear speed. In the depicted embodiment, gear sets 38a–38h are configured to provide the speed ratios and power curve presented in Table 2. Table 2 lists the number of gear teeth for each of the input gears 30 and output gears 36. Table 2 also illustrates the overall speed ratio provided by each gear set 38 and the percent of change of overall speed ratio between adjacent gear sets 38.

TABLE 2

Speed Ratios and Percent of Change of the Preferred Embodiment

| Gear Set | Input Gear Teeth | | Output Gear Teeth | | Overall Speed Ratio* | Percent of Change |
| --- | --- | --- | --- | --- | --- | --- |
| 38h | 30h | 40 | 36h | 80 | 1.00 | |
| | | | | | | 7.9 |
| 38g | 30g | 41 | 36g | 76 | 1.08 | |
| | | | | | | 11.2 |
| 38f | 30f | 45 | 36f | 75 | 1.20 | |
| | | | | | | 15.0 |
| 38e | 30e | 49 | 36e | 71 | 1.38 | |
| | | | | | | 18.6 |
| 38d | 30d | 54 | 36d | 66 | 1.64 | |
| | | | | | | 26.4 |
| 38c | 30c | 61 | 36c | 59 | 2.07 | |
| | | | | | | 34.2 |
| 38b | 30b | 68 | 36b | 49 | 2.78 | |
| | | | | | | 44.1 |
| 38a | 30a | 80 | 36a | 40 | 4.00 | |

*(Pedal hub sprocket to rear hub sprocket ratio is 2:1)

As shown by Table 2, input gear 30h of gear set 38h has 40 gear teeth while output gear 36h of gear set 38h has 80 gear teeth. Because the pedal hub sprocket to rear hub sprocket ratio is 2:1, gear set 38h provides an overall speed ratio of 1.00. The next adjacent gear set 38g has an input gear 30g with 41 gear teeth and an output gear 36g with 76 gear teeth. Gear set 38g provides an overall speed ratio of 1.08 which is a 7.9% change from the overall speed ratio provided by gear set 38h. As shown by Table 2, the depicted embodiment of transmission 20 provides tailored speed ratios and a progressive power curve which provides a lower percent of change between lower speed ratios and a higher "over drive" percent of change between higher speed ratios. As can be appreciated, because input gears 30 and output gears 36 do not directly engage one another and because their diameters are not restricted to a preset shaft-to-shaft dimension, the radii of input gears 30 and output gears 36, the number of teeth on input gears 30 and output gears 36 and the number of gear sets 38 may be varied to provide practically any tailored set of speed ratios and power curves for various applications.

IV. FREE WHEELING MECHANISMS

As further shown by FIG. 2, uni-directional free wheeling mechanisms 28a–28d are coupled to input shaft 26 between input shaft 26 and input gears 30 of gear sets 38a–38d. Uni-directional free wheeling mechanisms 28e–28h are coupled to output shaft 32 between output shaft 32 and output gears 36 of gear sets 38e–38h. As a result, each gear set 38a–38h is provided with at least one uni-directional free wheeling mechanism between a gear and the gear's respective shaft. As a result, any two gear sets 38 may be engaged by their corresponding connector gears 40 (shown in FIG. 1) at the same time without transmission 20 jamming or locking up. Consequently, at least one gear set 38 may be interconnected by the connector 40 and locked to output shaft 32 at all times so that shifting between gear sets 38 may be done under continuous power.

Uni-directional free wheeling mechanisms 28a–28h are each mounted to their respective shafts between the respective shafts and the gears carried by each shaft having the largest radii. In the depicted embodiment, uni-directional free wheeling mechanisms 28a–28d are mounted to shaft 26 adjacent input gears 30 of gear sets 38a–38d. Uni-directional free wheeling mechanisms 28e–28h are coupled to output shaft 32 adjacent to output gears 36 of gear sets 38e–38h. Because uni-directional free wheeling mechanisms 28a–28h are mounted adjacent to larger sized gears, uni-directional free wheeling mechanisms 28a–28h may be sized larger so as to be able to better withstand larger amounts of torque. Alternatively, uni-directional free wheeling mechanisms 28a–28h may be coupled to input shaft 26 adjacent all of input gears 30 of gear sets 38a–38h or uni-directional free wheeling mechanisms 28a–28h may be coupled to output shaft 32 adjacent to all of output gears 36 of gear sets 38a–38h. In addition, unidirectional free wheeling mechanisms 28 may be coupled to their respective shafts adjacent to any desired number of the gears carried by the respective shaft so long as each gear set includes at least one uni-directional free wheeling mechanism between one of the shafts and one of its gears.

Figure 3:
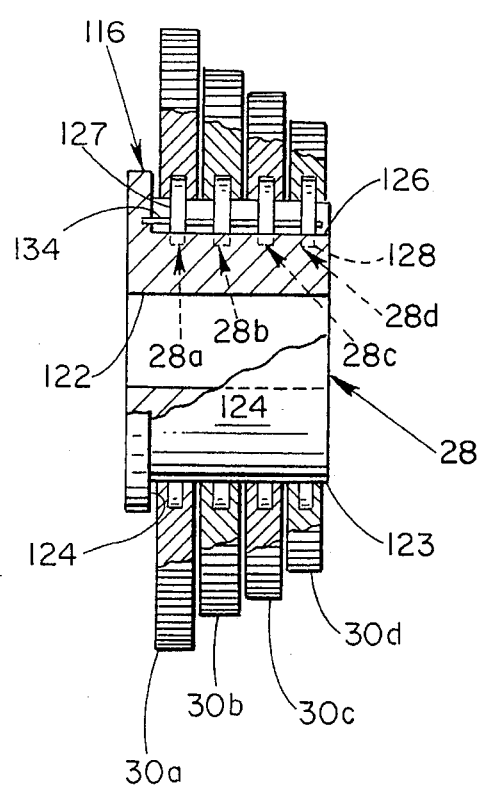
FIG. 3 is a sectional view of uni-directional free wheeling mechanisms and input gears.
Figure 4:
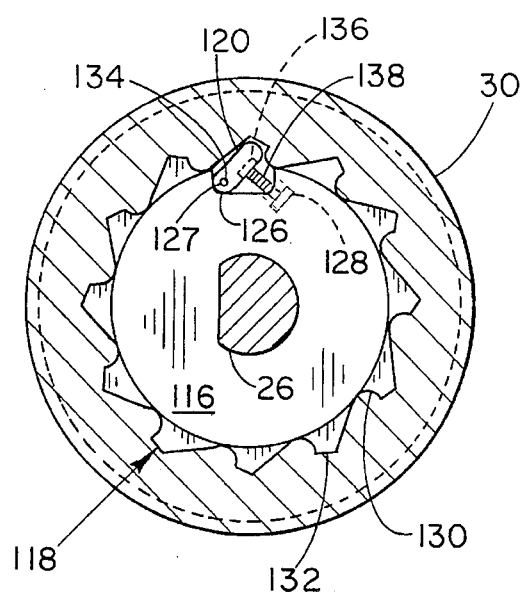
FIG. 4 is a side sectional view of the uni-directional free wheeling mechanisms and input gears of FIG. 3 coupled to an input shaft.

FIGS. 3 and 4 illustrate the preferred embodiment of unidirectional free wheeling mechanisms 28a–28d in greater detail. As shown by FIGS. 3 and 4, uni-directional free wheeling mechanisms 28a–28d include drum 116, ratchets 118, loaded cam or pawls 120 and mounting wire 127. Drum 116 is a single supporting structure for coupling to input shaft 26 and for defining a single slot which is used for each and every uni-directional free wheeling mechanism 28a–28d. Alternatively, each uni-directional free wheeling mechanism 28a–28d may be provided with its own individual drum with an individual slot or notch for receiving its individual pawl 120. In addition, drum 116 may alternatively be integrally formed as part of input shaft 126.

As shown by FIG. 3, drum 116 is generally cylindrical shaped and includes central bore 122, shoulder 124, slot 126 and mounting wire 127. Bore 122 extends through drum 116 and is sized for the reception of input shaft 26. Bore 122 is preferably shaped for being keyed with input shaft 26. The circumference 123 extends around drum 116 and engages ratchets 118. Shoulder 124 is formed where circumference 123 projects outwardly. Shoulder 124 abuts a face of gear 30a to align and maintain the gear 30a in proper position. Drum 116 defines slot 126 which longitudinally extends along and within circumference 123 of drum 116. In lieu of being defined by drum 116, slot 126 may alternatively be formed directly within input shaft 26. Slot 126 has a depth sufficient for completely receiving each pawl 120. Slot 126 has a length positioned for extending adjacent to input gears 30a–30d of gear sets 38a–38d. In the preferred embodiment, slot 126 includes channels 128 which extend into a lower surface of slot 126. Channels 128 correspond to each gear 30 and pawl 120. Channels 128 are sized for capturing one end of a spring mechanism of each pawl 120.

Mounting wire 127 is an elongated stiff wire which extends within slot 126 and has a first end embedded in shoulder 124 of drum 116. Mounting wire 127 extends through each pawl 120 so as to secure each pawl 120 in place within slot 126. Mounting wire 127 permits each pawl 120 to individually rotate or pivot about mounting wire 127.

FIG. 4 shows an individual ratchet 118 and pawl 120 in greater detail. Ratchets 118 are slotted or serrated surfaces formed or machined along an inner diameter of each of input gears 30a–30d of gear sets 38a–38d. Each ratchet 118 includes teeth 130 which define notches 132. Teeth 130 are oriented or pointed in a generally counterclockwise direction.

Pawls 120 are generally oblong, oval shaped cams which are spring loaded into engagement with ratchets 118. Each pawl 120 includes a pivot hole 134, channel 136 and a spring mechanism 138. Pivot hole 134 extends through pawl 120 and receives mounting wire 127 of drum 116. Pivot hole 134 permits pawl 120 to pivotally rotate about mounting wire 127 within slot 126. Channel 136 extends upward into a lower surface of each pawl 120. Each channel 136 receives the first end of spring mechanism 138. Each spring mechanism 138 has a first end coupled to its respective pawl 120 and a second end which engages drum 116. Preferably, the second end of each spring mechanism 138 is received within channel 128 defined within slot 126. As can be appreciated, spring mechanisms 138 may be coupled between pawls 120 and drum 116 by various attachment mechanisms. Spring mechanisms 138 preferably comprise coil springs. Alternatively, spring mechanisms 138 may comprise leaf springs or various other spring mechanisms as are conventionally known. Spring mechanisms 138 individually bias their respective pawls into engagement with each pawl's respective ratchet 118.

As shown by FIG. 4, drum 116 is fixedly mounted to input shaft 26 so that rotation of drum 116 also rotates input shaft 26. When a particular input gear 30 and its corresponding ratchet 118 rotate clockwise relative to the rotation of input shaft 26 and drum 116 (i.e., input gear 30 rotates clockwise at a speed greater than the clockwise speed of input shaft 26 and drum 116), teeth 130 of ratchet 118 continuously move pawl 120 against the bias or load of spring mechanism 138 into slot 128 so that pawl 120 does not lock within notches 132 of ratchet 118. As a result, the particular input gear 30 is permitted to freely rotate about drum 116 and input shaft 26. Alternatively, when the particular input gear 30 rotates in a counterclockwise, direction relative to the rotation of input shaft 26 and drum 116 (i.e., input gear 30 rotates clockwise at a speed less than the clockwise speed of input shaft 26 and drum 116), pawl 120 is biased into engagement with notches 132 of ratchet 118 by spring mechanism 138 such that pawl 120 locks input gear 30 to drum 116 and input shaft 26. As a result, when the input gears 30a–30d of gear sets 38a–38d rotate at different speeds, because of different speed ratios between gear sets 38a–38d, the input gear 30a–30d having the slowest speed will automatically be locked to drum 116 and input shaft 26 by its corresponding uni-directional free wheeling mechanism 28a–28d. Consequently, when the plurality of input bears 30a–30d are interconnected to a plurality of output gears 36 of gear sets 38a–38d at the same time, uni-directional free wheeling mechanisms 28a–28d automatically lock the slowest gear to input shaft 26 and disengages the faster gear or gears from input shaft 26. The remainder of input gears 30a–30d not coupled to a corresponding output gear 36 by a connector gear 40 are locked or coupled to input shaft 26 by pawls 120 and rotates at a speed equal to the speed of input shaft 26. As a result, adjacent gear sets 38 are being rotated at relatively the same speed when a successive adjacent connector gear 40 is being moved into engagement with the successive adjacent gear set 38. Thus, shifting between gear sets 38 does not require the establishment of a neutral state, and shifting may be performed under full power.

Uni-directional free wheeling mechanisms 28e–28h are identical to uni-directional free wheeling mechanisms 28a–28d except that ratchets 118 have opposite orientations such that teeth 130 point clockwise. Pawls 120 are appropriately biased such that when the plurality of input gears 30 are interconnected to a plurality of output gears 36 by connector gears 40, uni-directional free wheeling mechanisms 28e–28h permit gears 36e–36h to freely and individually rotate about drum 116 and shaft 32 when each gear 36e–36h rotates counterclockwise relative to drum 116 and shaft 32.

V. CONNECTOR GEARS AND YOKES

FIGS. 5 and 6 illustrate connector gears 40, yokes 46e–46h and yoke springs 50e–50h in greater detail. FIG. 5 shows an end view of a single representative yoke 46h. FIG. 6 is a side view of connector gears 40 rotatably mounted to yokes 46e–46h which carry yoke springs 50e–50h. As discussed above, the yokes 46a–46d and springs 50a–50d are substantially identical to the yokes 46e–46h and springs 50e–50h but are merely pivotally mounted to housing 24 about a different yoke pivot rod 48b. As shown by FIG. 5, yokes 46e–46h are thin elongate plate-like members including apertures 64, 66 and connector gear slot 140. Aperture 64 extends through each yoke 46 and is sized for receiving its respective yoke pivot rod 48a or 48b. Each aperture 64 of each yoke 46e–46h is in alignment with aperture 64 of adjacent yokes 46e–46h. As a result, a single yoke pivot rod 48a is inserted through aperture 64 such that each yoke 46e–46h pivots so as to move connector gears 40 into and out of engagement with gear sets 38.

Aperture 66 extends through connector end 60 and is sized for receiving gear pin 68 so as to rotatably support one of connector gears 40. Unlike aperture 64, the location of aperture 66 within connector end 60 of each yoke 46e–46h varies depending upon the diameter of input gears 30 and output gears 36 of the corresponding gear set 38 and diameter of connector gear 40. Aperture 66 is located so that connector gear 40 is accordingly positioned to be movable into mutual engagement with input gear 30 and output gear 36 of the corresponding gear set 38.

Connector gear slot 140 extends upward and through connector end 60 of each yoke 46e–46h. Connector gear slot 140 preferably has a width slightly greater than the width of connector gear 40 so that connector gear 40 may freely rotate within connector gear slot 140. Each yoke 46e–46h is slightly narrower than the spacing of gears 30 and gears 36 so as to allow yokes 46e–46h to move individually. Yokes 46e–46h are rotatably mounted between left casing 82, right casing 84 and retainer 52a to maintain a proper vertical alignment.

FIG. 6 is a side view of yokes 46e–46h carrying yoke springs 50e–50h and connector gears 40. For ease of illustration, each yoke 46, connector gear 40 and spring 50 is shown offset from adjacent yokes 46, gears 40 and springs 50. Yokes 46a–46d are identical to yokes 46e–46h but are pivoted about yoke pivot rod 48b instead. As best shown by FIG. 6, each connector gear 40 is rotatably coupled to an individual yoke 46e–46h by the gear pin 68 through aperture 66 within each of yokes 46e–46h. Each aperture 66 and gear pin 68 rotatably support the connector gear 40 at various locations along each one of yokes 46e–46h so that the corresponding connector gear 40 is moved into mutual engagement with the various combinations of differently sized input gears 30 and output gears 36.

Yokes 46e–46h are shaped to accommodate the various necessary locations of apertures 66 and gear pins 68, apertures 64, yoke pivot rod 48a, and cam lobe contacts 62. Accordingly, yokes 46 may have any shape encompassing these three points. In the preferred embodiment shown, each of yokes 46e–46h has a generally trapezoidal shaped body which includes rear edge 142, front edge 144 and top and bottom edges 146, 148. Top and bottom edges 146 and 148 diverge away from one another from rear edge 142 towards front edge 144 to give each yoke 46a its trapezoidal shape. As a result, front edge 144 is longer than rear edge 142 so that front edge 144 may accommodate the various locations of apertures 66 and gear pins 68. Front edge 144 is preferably concave so that only a small radial portion of each connector gear is disposed within connector slot 140 (shown in FIG. 5) and so that the main body of each of yokes 46e–46h does not contact gear sets 38 during the movement of connector end 60 of each of yokes 46e–46h towards gear sets 38. As a result, connector end 60 of each of yokes 46e–46h may be pivoted a larger distance forward so that smaller connector gears 40 may be used to interconnect gear sets 38 having differently sized input gears 30 and output gears 36. As can be appreciated, yokes 46a–46h may have any one of a variety alternate shapes and configurations for pivotally and rotatably supporting connector gears 40.

VI. SELECTOR CAM

Figure 8:
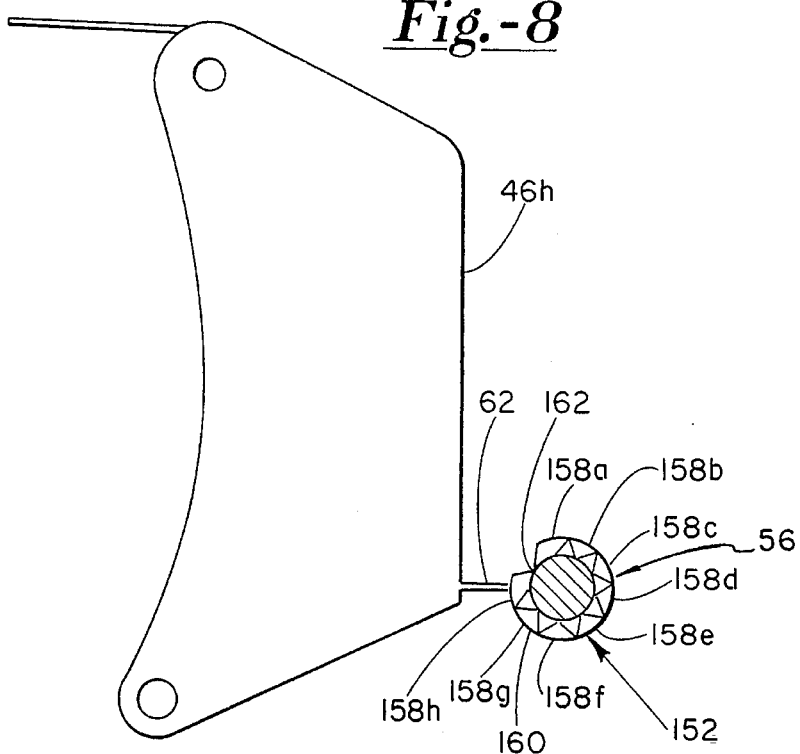
FIG. 8 is a side sectional view of a selector cam in engagement with a yoke of the multi-speed transmission of FIG. 1.
Figure 9:
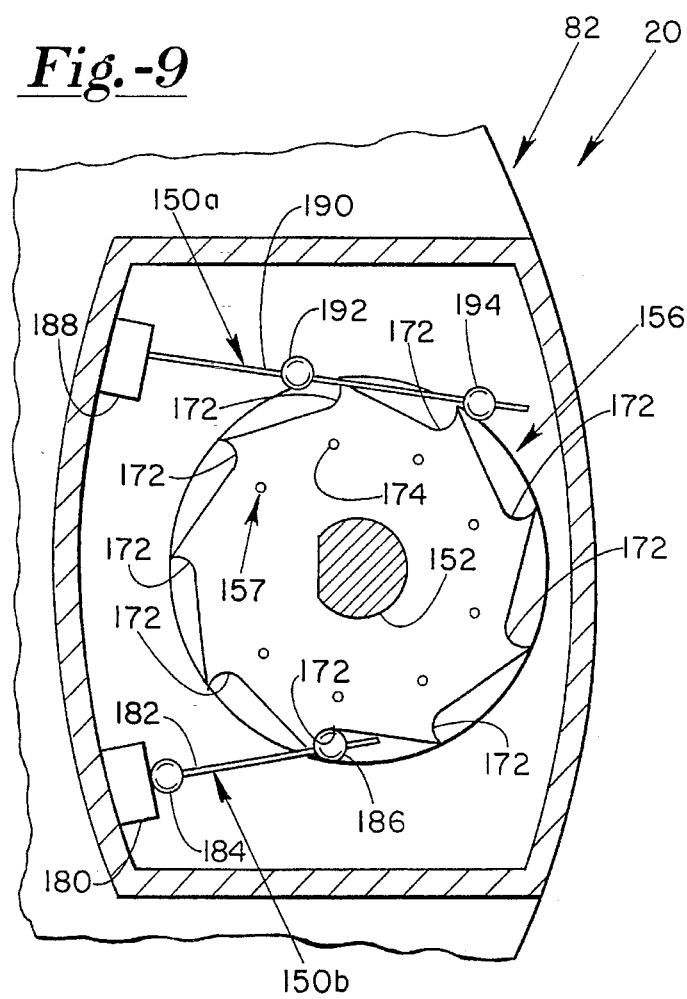
FIG. 9 is a side view of the selector cam and shifters of the multi-speed transmission of FIG. 1.

FIGS. 7–9 show selector cam 56 in greater detail. FIG. 7 shows a sectional view of transmission 20 taken along lines 7—7 of FIG. 1. FIG. 8 shows selector cam 56 in engagement with cam lobe contact 62 of yoke 46h. FIG. 9 shows a side view of selector cam 56 in operational engagement with shifters 150a and 150b. As best shown by FIG. 7, selector cam 56 includes cam shaft 152, bearings 153, 154, cam disk 156 and index 157. Cam shaft 152 is generally an elongated cylinder which traverses each one of yokes 46a–46h and their corresponding cam lobe contacts 62. Cam shaft 152 has opposite ends which are rotatably coupled to right casing 84 and left casing 82 by bearings 153 and 154, respectively. Bearings 153 and 154 preferably comprise sleeve bearings, as are conventionally known, which are secured within cavities defined by left casing 82 and right casing 84. As can be appreciated, other bearing mechanisms such as ball bearings may be used in lieu of sleeve bearings 153 and 154 for rotatably supporting cam shaft 152 within housing 24.

Cam shaft 152 carries a plurality of cam lobes 158a–158h. Each cam lobe 158 corresponds to and is in alignment with an individual cam lobe contact 62 of one of yokes 46a–46h. Cam lobes 158a–158h (best shown in FIG. 8) are axially and radially spaced from one another about cam shaft 152. Each cam lobe 158 includes an outer surface 160 and an inner surface 162. Outer surface 160 of each cam lobe 158 engages cam lobe contact 62 (shown in FIGS. 6 and 8) of one of yokes 46a–46h so that a connector gear 40 carried by one of the yokes 46a–46h interconnects the corresponding gear set 38. Inner surface 162 of each cam lobe engages cam lobe contact 62 of one of yokes 46a–46h to permit cam lobe contact 62 and its corresponding yoke 46a–46h to be retracted out of engagement with the corresponding gear set 38 by the biasing force of its corresponding spring 50a–50h. Alternatively, yokes 46a–46h, connector gears 40 and springs 50a–50h may be configured and located such that springs 50a–50h bias connector gears 40 into engagement with gear sets 38 wherein selector cam 56 selectively engages yokes 46a–46h to move yokes 46a–46h and their respective connector gears 40 out of engagement with gear sets 38. Rotation of cam shaft 152 causes at least one cam lobe 158 to engage a corresponding cam lobe contact 62 so that at least one yoke 46 and its corresponding connector gear 40 is moved into engagement with a selected gear set 38. In the preferred embodiment, cam lobes 158 are axially and radially spaced so that adjacent yokes 46 and connector gears 40 may be sequentially actuated towards or away from corresponding adjacent gear sets 38. As a result, selector cam 56 provides sequential shifting between adjacent gear sets 38. Alternatively, other mechanisms may be used in lieu of selector cam 56 to sequentially actuate or move non-adjacent yokes 46 and connector gears 40 in and out of engagement with non-adjacent gear sets 38. For example, shifting mechanisms may alternatively be provided for sequentially actuating non-adjacent yokes 46h and 46f to shift directly between gear sets 38h and 38f without the need for engaging gear set 38g.

As best shown by FIG. 8, each lobe partially encircles cam shaft 152 and has an outer surface 160 overlapping the outer surfaces 160 of adjacent cam lobes 158. As a result, outer surfaces 160 of adjacent lobes may simultaneously contact cam lobe contacts 62 of two adjacent yokes 46 to pivot their two respective connector gears 40 into engagement with their two respective gear sets 38. Consequently, the first connector gear 40 may be pivoted into mutual engagement with gear set 38 before a second already engaged connector gear 40 is moved out of engagement with its respective gear set 38. Continued rotation of cam shaft 152 causes the second already engaged connector gear 40 to become disengaged. As a result, lobes 158 of cam shaft 152 move connector gears 40 so that at least one connector gear 40 is always interconnecting a gear set 38 to provide continuous power even during shifting between gear sets 38. As discussed above, uni-directional free wheeling mechanisms 28 prevent transmission 20 from locking up when the first and second gear sets 38 are engaged by connector gears 40 simultaneously.

As shown by FIG. 7, cam shaft 152 is preferably keyed to cam disk 156 such that rotation of cam disk 156 rotates cam shaft 152. As a result, cam shaft 152 and its corresponding lobes 158a–158h may be selectively rotated so as to shift different connector gears 40 into engagement with gear sets 38 by rotation of cam disk 156. Cam disk 156 is preferably positioned adjacent to left casing 82 which is preferably shaped so as to completely enclose cam disk 156. Cam disk 156 is keyed to an end of cam shaft 152 and includes tracks 166, 168. Tracks 166 and 168 extend along an outer perimeter of cam disk 156. The outer circumferential surface of track 166 defines slots 170. Slots 170 are sized for receiving and engaging shifter 150a (shown in FIG. 9). Slots 170 are spaced and positioned about cam disk 156 to correspond to the selected rotational positions of lobes 158a–158h. Similarly, track 168 includes slots 172. Slots 172 extend into the surface of track 168 and are sized for engaging with shifter 150b (shown in FIG. 9). Slots 172 are also spaced and positioned about cam disk 156 to correspond with selected rotational orientations of lobes 158a–158h. In the preferred embodiment, slots 170 are used to rotate cam shaft 152 counterclockwise while slots 172 are used to rotate cam shaft 152 clockwise for down shifting and up shifting, respectively.

Index 157 includes indentations 174, notch 175, spring 176 and bead 178. Indentations 174 extend into the face of cam disk 156 and are spaced at selected locations about a circumference of cam disk 156 corresponding to cam disk positions for different gear speeds. Notch 175 extends into left casing 82 and contains spring 176 and bead 178. Spring 176 biases a surface of bead 178 into engagement with the face of cam disk 156. Notch 175 is aligned with indentations 174 so that spring 176 forces bead 178 into releasable engagement with indentations 174. As a result, index 157 indicates precise cam disk locations for selecting different speed ratios by rotating cam disk 156. Index 174 also aids in maintaining cam disk 156 in a selected radial position.

FIG. 9 further illustrates shifters 150a and 150b. FIG. 9 illustrates shifters 150a and 150b in engagement with cam disk 156 for rotation of cam shaft 152 to shift between speed ratios by interconnecting different gear sets 38 with connector gears 40. As shown by FIG. 9, shifter 150b includes an upshift cable housing 180, upshift cable 182, stop bead 184 and shift bead 186, while shifter 150a includes downshift cable housing 188, downshift cable 190, stop bead 192 and shift bead 194. Upshift cable housing 180 encloses upshift cable 182 which ultimately is coupled to one of two thumb levers (not shown) mounted conveniently near the handlebar grips of the bicycle in which transmission 20 is employed. Upshift cable 182 preferably comprises typical bicycle cable as is conventionally used in bicycles. Stop bead 184 and shift bead 186 are secured to the lower end of cable 182 outside of cable housing 180. Stop bead 184 and shift bead 186 are held against cam disk 156 so as to engage slots 172 by cable 182. FIG. 9 shows shift bead 186 in a fully engaged position within slots 172 just before the corresponding thumb shift lever is released. FIG. 9 also shows shift bead 194 in a neutral position before any down shifting of cam disk 156. Shift beads 186 and 194 are preferably maintained in engagement with tracks 168 and 166 of cam disk 156 by the stiffness of cables 182 and 190, respectively.

Shift bead 186 is sized for reception within slots 172 and engages slots 172 to rotate cam disk 156 in a clockwise direction so that a successively higher cam lobe 158 is rotated to engage its corresponding yoke 46 and to move the yoke's connector gear 40 into engagement with a successively higher gear set 38 having a higher speed ratio. Continued rotation of cam disk 156 also causes the presently engaged cam lobe 158 to rotate so that its corresponding yoke 46 and connector gear 40 are retracted out of engagement with the presently engaged gear set 38. As discussed above, because adjacent lobes 158 radially overlap one another, a successive gear set will be in engaged before the preceding gear set is completely disengaged by connector gears 40. Stop bead 184 is sized larger than the opening of upshift cable housing 180. Stop bead 184 is spaced from shift bead 186 at a selected distance to limit the degree by which cam disk 156 is rotated with a single shifting action.

Down shift cable housing 188, down shift cable 190, stop bead 192 and shift bead 194 perform similar functions to housing 180, cable 182 and beads 184, 186, respectively. However, shift bead 194 engage slots 170 to rotate cam disk in an opposite, counterclockwise direction to rotate cam lobes 158 such that a successively lower cam lobe 158 engages one of yokes 46a, 46h and the presently engaged cam lobe 158 disengages its corresponding yoke. As a result, one of connector gears 40 interconnects the next successively lower gear set 38 while the presently engaged connector gear 40 is retracted from the preceding higher gear set 38 upon continued rotation of cam disk 156.

VII. OPERATION

In operation, speed ratios between the input shaft 26 and output shaft 32 are changed by actuation of shifters 150a and 150b. Depending upon the desired direction of shifting, either shift bead 158 or shift bead 166 will engage its corresponding slot 170 or slot 172 to rotate cam disk 156 in a counter clockwise direction or clockwise direction, respectively. Rotation of cam disk. 156 also rotates cam shaft 152 and its corresponding cam lobes 158 so that the outer surface 160 of the next successive cam lobe 158 is brought into engagement with its corresponding cam lobe contact 62 of the next successive yoke 46. As a result, the next successive yoke 46 and its corresponding connector gear 40 are moved against the spring biasing force of the particular yoke spring 50 into mutual engagement with the corresponding next successive gear set 38. Because cam lobes 158 are radially located about cam shaft 152 so as to partially overlap one another, the next successive connector gear 40 is moved into engagement with its corresponding gear set 38 before the preceding connector gear 40 is retracted out of engagement with its respective gear set 38 by one of springs 50a–50h. Although the preceding and the successive connector gears 40 simultaneously interconnect different gear sets 38 which have different rotational speeds, transmission 20 does not lock up because free wheeling uni-directional mechanisms 28 couple only one; gear to their respective input and output shafts when a plurality of gears are rotating about the respective input and output shafts at different speeds. As a result, only one gear set 38 is permitted to transfer power from input shaft 26 to output shaft 32 at any particular moment. Because the successive gear set is interconnected by connector gear 40 before the preceding gear set 38 is disconnected, shifting is performed under full continuous power without a neutral stage. Continued activation of shifter 150a or 150b causes further rotation of cam disk 156 and further rotation of cam shaft 152 to cause the preceding cam lobe 158 to rotate to a preselected position so that cam lobe contact 62 and its respective yoke 46 will be biased by spring 50 into engagement with inner surface 162 of the preceding lobe 158. Consequently, the further rotation of cam disk: 156 and cam shaft 152 completes the shifting between gear sets 38 by causing the preceding connector gear 40 to be retracted out of engagement with its respective preceding gear set 38 after the successive gear set 38 has been connected by a connector gear 40. Completion of shifting between gear sets 38 is indicated when either stop bead 184 or stop bead 192 abuts housing 180 or housing 188, respectively, depending upon the direction of shift. Completion of shifting is further indicated by bead 178 engaging indentation 174 of index 157. As can be appreciated, any one of a variety of mechanisms may be used to index the rotation of cam disk 156 and cam shaft 152 to indicate completion of shifting between gear sets 138. In addition, other mechanisms may alternatively be used to provide controlled rotation of cam shaft 152 such as hydraulic/pneumatic controls, actuators and the like.

VIII. CONCLUSION

The present invention provides an enclosed, linearly sequenced geared transmission that shifts under continuous power, has a minimum number of gears engaged at any one time to minimize friction and power loss, and does not require continuous adjustment. The present invention also provides tailored speed ratios and progressive power curves, for different uses.

As mentioned earlier, the present invention may be used in a variety of vehicles and stationary equipment. For example, when employed in winches and block/tackle equipment where a high-speed gear is used to take up slack and a low-speed gear is used under full load, the present invention may be employed to automatically shift between the two gear applications by using the cable or rope tension to engage a connector gear for the lower speed. As a result, when the cable or rope tension is slack, the yoke spring disengages the low gear to cause slack to be taken up at a higher speed.

Although the present invention has been described with reference to preferred embodiments, workers skilled in the art will recognize that changes may be made in form and detail without departing from the spirit and scope of the invention.

What is claimed is:

1. A multi-speed transmission for transmitting power between a first shaft and a second shaft, the transmission comprising:

a plurality of gear sets, each gear set including:
a first gear rotatably disposed about the first shaft;
a uni-directional free wheeling mechanism between the first gear and the first shaft for permitting the first gear to freely rotate about the first shaft when the first gear rotates in a first direction relative to the rotation of the first shaft and for coupling the first gear to the first shaft at all other times;
a second gear coupled to the second shaft, wherein the second gear is spaced apart from the first gear; and
a plurality of connector gears corresponding to the plurality of gear sets, each connector gear being movable between an engaged position and a disengaged position, wherein each connector gear mutually engages the first gear and the second gear in the engaged position and is disengaged from the first gear and the second gear in the disengaged position; and
a shifting mechanism for moving each one of the plurality of connector gears between the engaged position and the disengaged position, wherein at least one of the plurality of connector gears is always in the engaged position and wherein at least two of the connector scars arc simultaneously in the engaged position during shifting between the gear sets.

2. The transmission of claim 1 wherein the shifting mechanism includes:
a plurality of yokes corresponding to the plurality of connector gears, each yoke having a first end rotatably coupled to a corresponding connector gear and a second end mounted about a pivot so that the corresponding connector gear can be moved into mutual engagement with the first and second gears; and
means for moving each one of the :plurality of yokes about the pivot.

3. The transmission of claim 2 wherein the means for moving includes:
a cam shaft having a plurality of axially and radially spaced lobes, each lobe having a first surface for engaging one of the plurality of yokes so that the corresponding connector gear is pivoted into mutual engagement with the first and second gears of its corresponding gear set and a second surface for engagement with one of the plurality of yokes so that the corresponding connector gear is pivoted out of mutual engagement with the first and second gears of its corresponding gear set, wherein the plurality of lobes are radially spaced about the shaft so that the first surfaces of adjacent lobes overlap and so that a first one of the plurality of connector gears is pivoted into mutual engagement with the first and second gears of its corresponding gear set before a second one of the plurality connector gears is disengaged from the first and second gears of its corresponding gear set during shifting; and
means for rotating the cam shaft.

4. The transmission of claim 3 wherein means for rotating the cam shaft includes:
a cam disk coupled to the cam shaft; and
a cable engaging the cam disk and permitting the cam disk to be rotated by movement of the cable.

5. The transmission of claim 4 further including:
an index to indicate cam disk positions for different gear speeds and to maintain the cam disk in a selected position.

6. The transmission of claim 1 wherein the uni-directional free wheeling mechanism permits the first gear to freely rotate about the first shaft when the first gear rotates at a speed less than the speed at which the first shaft rotates and couples the first gear to the first shaft at all other times.

7. The transmission of claim 1 wherein the uni-directional free wheeling mechanism includes:
a drum having an outer surface and being coupled to the first shaft between the first shaft and the first gear, the outer surface of the drum defining a slot;
a plurality of teeth on an inner diameter of the first gear and encircling the outer surface of the drum, the teeth being oriented in a second direction; and
a pawl positioned within the slot of the drum and biased for engaging the teeth of the first gear so that the pawl permits the first gear to freely rotate about the first shaft when the first gear rotates in a preselected direction relative to the rotation of the first shaft and so that the pawl locks the first gear to the drum at all other times.

8. The transmission of claim 1 wherein each uni-directional free wheeling mechanism engages its corresponding first gear simultaneously with uni-directional free wheeling mechanisms of other gear sets engaging their corresponding first gear.

9. A multi-speed transmission for transmitting power between a first shaft and a second shaft, the transmission comprising:
a plurality of gear sets, each gear set including:
a first gear encircling the first shaft;
a uni-directional free wheeling mechanism corresponding to the first gear between the first gear and the first shaft, wherein the uni-directional free wheeling mechanism permits the first gear to freely rotate about the shaft when the first gear totals in a preselected direction relative to the rotation of the first shaft and couples the first gear to the first shaft at all other times and wherein the uni-directional free wheeling mechanism is biased into contact with its corresponding first gear simultaneously with uni-directional free wheeling mechanisms of other gear sets being biased into contact with their corresponding first gear; and
a second gear coupled to the second shaft; and
means for interconnecting the first gear and the second gear so that force is transferred between the first gear and the second gear of the plurality of gear sets, wherein at least two of the gear sets are simultaneously interconnected during shifting.

10. The multi-speed transmission of claim 9 wherein the means for interconnecting includes:

a plurality of connector gears corresponding to the plurality of gear sets, each connector gear being movable between an engaged position and a disengaged position, wherein each connector gear mutually engages the first gear and the second gear in the engaged position and is disengaged from the first gear and the second gear in the disengaged position; and a shifting mechanism for moving each one of the plurality of connector gears between the engaged position and the disengaged position, wherein at least two of the connector gears are simultaneously in the engaged position during shifting.

11. The transmission of claim 10 wherein the shifting mechanism includes:

a plurality of yokes corresponding to the plurality of connector gears, each yoke having a first end rotatably coupled to a corresponding connector gear and a second end mounted about a pivot so that the corresponding connector gear can be moved into mutual engagement with the first and second gears; and means for moving each one of the plurality of yokes about the pivot.

12. The transmission of claim 11 wherein the means for moving includes:

a cam shaft having a plurality of axially and radially spaced lobes, each lobe having a first surface for engaging one of the plurality of yokes so that the corresponding connector gears pivoted in the mutual engagement with the first and second gears of its corresponding gear set and a second surface for engagement with one of the plurality of yokes so that the corresponding connector gear is pivoted out of mutual engagement with the first and second gears of its corresponding gear set; and means for rotating the cam shall.

13. The transmission of claim 12 wherein the means for rotating the cam shaft includes:

a cam disk coupled to the cam shall; and a cable engaging the cam disk and for letting the cam disk to be rotated by movement of the cable.

14. The transmission of claim 9 wherein the uni-directional free wheeling mechanism permits the first gear to freely rotate about the first shaft when the first gear rotates at a speed less than the speed at which the first shaft rotates and wherein the uni-directional free wheeling mechanism couples the first gear to the first shaft at all other times.

15. The transmission of claim 9 wherein the uni-directional free wheeling mechanism includes:

a drum having an outer surface and being coupled to the first shaft between the first shaft and the first gear, the outer surface of the drum defining a slot;

a plurality of teeth on an inner diameter of the first gear and encircling the outer surface of the drum, the teeth being oriented in a first direction; and a pawl positioned within the slot of the drum and biased for engaging the teeth of the first gear so that the pawl permits the first gear to freely rotate about the first shaft when the first gear rotates in a preselected direction relative to the rotation of the first shaft and so that the pawl locks the first gear to the drum at all other times.

16. An improved multi-speed transmission for transmitting power between input and output shafts, wherein a first one of the shafts carries a plurality of differently sized gears and a second one of the shafts carries a gear, and wherein the output shaft is rotated at a variety of speeds by interconnecting the gears of the input and output shafts, an improvement comprising:

a plurality of uni-directional free wheeling mechanisms between the first one of the shafts and the plurality of differently sized gears, wherein each one of the plurality of uni-directional free wheeling mechanisms is aligned with and corresponds to one of the plurality of differently sized gears, wherein the plurality of uni-directional free wheeling mechanisms are simultaneously biased into contact with the plurality of differently sized gears, and wherein each uni-directional free wheeling mechanism permits its corresponding gear to freely rotate about the first one of the shafts when the corresponding gear rotates in a preselected direction relative to the rotation of the first one the the shafts and wherein each uni-directional free wheeling mechanism automatically couples its corresponding gear to the first one of the shafts at all other times so that the first one of the shafts is interconnected to the second one of the shafts by only one of the plurality of differently sized gears of the first one of the shafts, 17. The improved multi-speed transmission of claim 16 wherein each uni-directional free wheeling mechanism permits its corresponding gear to freely rotate about the first one of the shafts when the corresponding gear rotates at a speed less than the speed at which the first one of the shafts rotates and wherein each uni-directional free wheeling mechanism couples its corresponding gear to the first one of the shafts at all other times.

18. A multi-speed transmission for transmitting power between an input shaft and an output shaft, the transmission comprising:

a first array of gears of decreasing size disposed about the input shaft;

a second opposing array of gears of increasing size disposed about the output shaft opposite the first array of gears, wherein each gear of the output shaft corresponds to a gear of the input shaft and wherein each corresponding pair of gears includes a uni-directional free wheeling mechanism between at least one of the gears and, its respective shaft so that the gear freely rotates about its shaft when the gear rotates in a preselected direction relative to the rotation of its shaft and so that the gear is coupled to its shaft at all other times;

an array of connector gears, each connector gear corresponding to each corresponding pair of gears of the input and output shafts and being movable into mutual engagement with the corresponding pair of gears of the input end output shafts; and a shifting mechanism for moving each one of the array of connector gears into and out of engagement with a corresponding pair of gears of the input and output shafts, wherein at least one of the array of connector gears is maintained in engagement with a corresponding pair of gears of the input and output shafts and wherein at least two of the connector gears are simultaneously in engagement with corresponding pairs of gears during shifting.

19. The multi-speed transmission for transmitting power between an input shaft and an output shaft, the transmission comprising:

a first array of gears fixedly coupled to the input shaft;

a second array of input gears encircling the input shaft;

a first plurality of uni-directional free wheeling mechanisms corresponding to each one of the second array of input gears between the input shaft and each one of the second array of input gears, each uni-directional free wheeling mechanism permitting the corresponding gear to freely rotate about the input shaft when the corresponding gear rotates in a preselected direction relative to the rotation of the input shaft, each uni-directional free wheeling mechanism further coupling the corresponding gear to the input shaft at all other times;

a first array of output gears fixedly coupled to the output shalt, each one of the first array of output gears corresponding to one of the second array of input gears;

a second array of output gears encircling the output shaft, each one of the second array of output gears corresponding to one of the first array of input gears; a second plurality of uni-directional free wheeling mechanisms corresponding to each one of the second array of output gears between the output shaft and each one of the second array of output gears, each uni-directional free wheeling mechanism permitting the corresponding gear to freely rotate about the output shaft when the corresponding gear rotates in a preselected direction relative to the rotation of the output shaft, each uni-directional free wheeling mechanism further coupling the corresponding gear to the output shaft at all other times; and means for selectively interconnecting one of the gears of the input shaft to one of the gears of the output shaft to transmit power from the input shaft to the output shaft.

20. An improved multi-speed transmission for transmitting power between input and output shafts, wherein a first one of the shafts carries a plurality of differently sized gears and a second one of the shafts carries a gear, and wherein the output shaft is rotated at a variety of speeds by interconnecting the gears of the input and output shafts, an improvement comprising:

a drum fixedly coupled to the first one of the shafts between the first one of the shafts and the plurality of differently sized gears, the drum defining a slot axially extending along the drum adjacent to an inner diameter of each one of the plurality of differently sized gears;

a plurality of teeth on an inner diameter of each one of the plurality of differently sized gears encircling the drum, the plurality of teeth being oriented in a first direction; and a plurality of pawls, each pawl corresponding to one of the plurality of differently sized gears and being positioned within the slot of the drum and biased for engaging the teeth of the corresponding gear so that the pawl permits the corresponding gear to freely rotate about the drum when the corresponding gear rotates in a preselected direction relative to the rotation of the drum and so that the pawl locks the corresponding gear to the drum at all other times, wherein the plurality of pawls are simultaneously biased into contact with the plurality of differently sized gears so that at least one of the gears is always locked to the drum.

21. A multi-speed transmission for transmitting power between a first shaft and a second shaft, the transmission comprising:

a plurality of first gears rotatably disposed about the first shaft;

a plurality of second gears coupled to the second shaft;

a plurality of uni-directional free wheeling mechanisms between the first gears and the first shaft, wherein rite plurality of uni-directional free wheeling mechanisms simultaneously engage the plurality of first gears and wherein each uni-directional free wheeling mechanism permits its corresponding first gear to freely rotate about the first shaft when its corresponding first gear rotates in a first direction relative to the rotation of the first shaft and couples its corresponding first gear to the first shaft at all other times; and means for interconnecting at least one of the first and second gears and for simultaneously interconnecting a pair of the first gears with a pair of the second gnats during shifting.

* * * * *

UNITED STATES PATENT AND TRADEMARK OFFICE
CERTIFICATE OF CORRECTION

PATENT NO. : 5,553,510
DATED : SEPTEMBER 10, 1996
INVENTOR(S) : ALAN C. BALHORN

It is certified that error appears in the above-indentified patent and that said Letters Patent is hereby corrected as shown below:

Col. 2, line 61, delete "raft", insert --ratios--

Col. 6, line 35, delete "wild", insert --will--

Col. 6, line 38, after "rotating", delete ";"

Col. 7, lines 30 and 31, delete "unidirectional", insert --uni-directional--

Col. 8, line 40, delete "unidirectional", insert --uni-directional--

Col. 10, line 30, delete "unidirectional", insert --uni-directional--

Col. 10, line 47, delete "mariner", insert --manner--

Col. 14, line 28, after "free", delete ","

Col. 14, line 33, delete "unidirectional", insert --uni-directional--

Col. 14, line 56, after "being", delete ","

Col. 15, line 63, delete "bears", insert --gears--

UNITED STATES PATENT AND TRADEMARK OFFICE
CERTIFICATE OF CORRECTION

PATENT NO. : 5,553,510
DATED : SEPTEMBER 10, 1996
INVENTOR(S) : ALAN C. BALHORN

It is certified that error appears in the above-indentified patent and that said Letters Patent is hereby corrected as shown below:

Col. 21, lines 44 and 45, delete "scars arc", insert --gears are--

Col. 21, line 56, delete ":plurality", insert --plurality--

Col. 22, line 9, after "plurality", insert --of--

Col. 22, line 56, delete "totals", insert --rotates--

Col. 23, line 41, delete "shall", insert --shaft--

Col. 23, line 44, delete "shall", insert --shaft--

Col. 24, line 45, after "and", delete ","

Col. 24, line 55, delete "end", insert --and--

Col. 26, line 29, delete "rite", insert --the--

Col. 26, line 41, delete "gnats", inserts --gears--

Signed and Sealed this

Seventeenth Day of December, 1996

Attest:

BRUCE LEHMAN

*Attesting Officer*    *Commissioner of Patents and Trademarks*